Dec. 1, 1931.  B. LUNDGREEN  1,834,627
SPINDLE MOUNTING
Filed May 11, 1929  2 Sheets-Sheet 1

Inventor
BRUNO LUNDGREEN
By A.K. Parsons
Attorney

Patented Dec. 1, 1931

1,834,627

UNITED STATES PATENT OFFICE

BRUNO LUNDGREEN, OF CINCINNATI, OHIO, ASSIGNOR TO CINCINNATI GRINDERS INCORPORATED, OF CINCINNATI, OHIO, A CORPORATION OF OHIO

SPINDLE MOUNTING

Application filed May 11, 1929. Serial No. 362,357.

This invention relates to improvements in grinding machinery and has particular reference to an improved form of spindle mounting for use in connection with heavy precision grinders or like machine tools. Prior to the present invention it has been customary in the manufacture or construction of precision grinding machinery, to utilize suitable lubricated plane babbitted or like bearings for the spindle bearing grinding wheel. This has been deemed necessary, for the reason that machines of this sort are utilized for the performance of heavy grinding operations introducing considerable feed pressure between the grinding wheel and the work and at the same time must be maintained of such accuracy that when used for continuous production purposes, the various work pieces produced thereby will be accurate to a fractional thousandth of an inch. For this reason it has not been considered generally practicable to utilize ordinary anti-friction bearings, due to a tendency of introduction of chatter or vibration in the spindle as the same rotates within such bearings, and due, in addition, to disturbance of exact accuracy of the machine under compression or distortion yield of the individual bearing members under fluctuations of feed or stopping pressure.

The principal object, therefore, of the present invention is the provision of a structure which will make it possible to utilize anti-friction bearings for the support of a grinding machine spindle of this nature and to secure from a machine embodying these elements a smoothness of operation and accuracy of resultant product comparable with the best results heretofore attained with ordinary plane bearings.

A further object of the invention is the provision of a construction which will permit of a pre-loading of the anti-friction bearing and an adjustment of the pre-loading distortion thereof while the spindle is running or in operation, whereby the play may be satisfactorily removed under dynamic or working conditions as distinguished from attempted adjustment thereof to care for such conditions when the machine is at rest or in partially disassembled condition.

Other objects and advantages of the present invention should be readily apparent by reference to the following specification, considered in conjunction with the accompanying drawings, and it will be understood that any modifications may be made in the specific structural details shown and described within the scope of the appended claims without departing from or exceeding the spirit of the invention.

Figure 1:
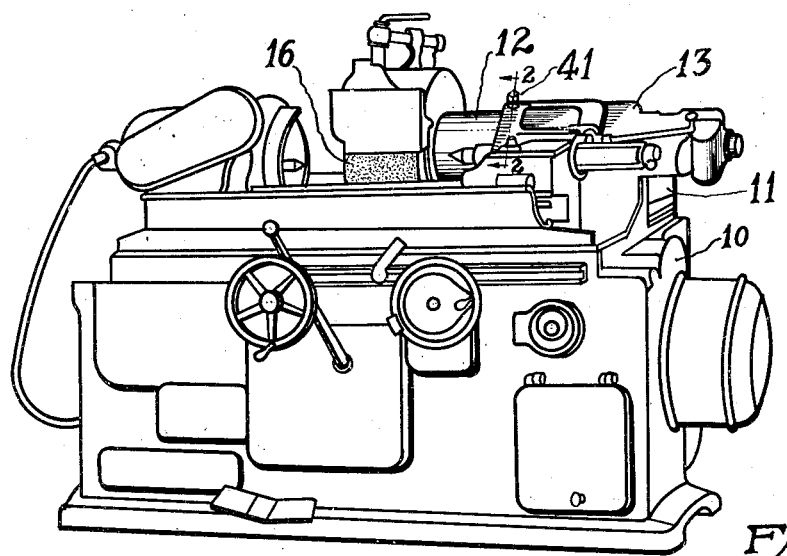
Figure 1 is a perspective view of a machine embodying the present invention.
Figure 2:
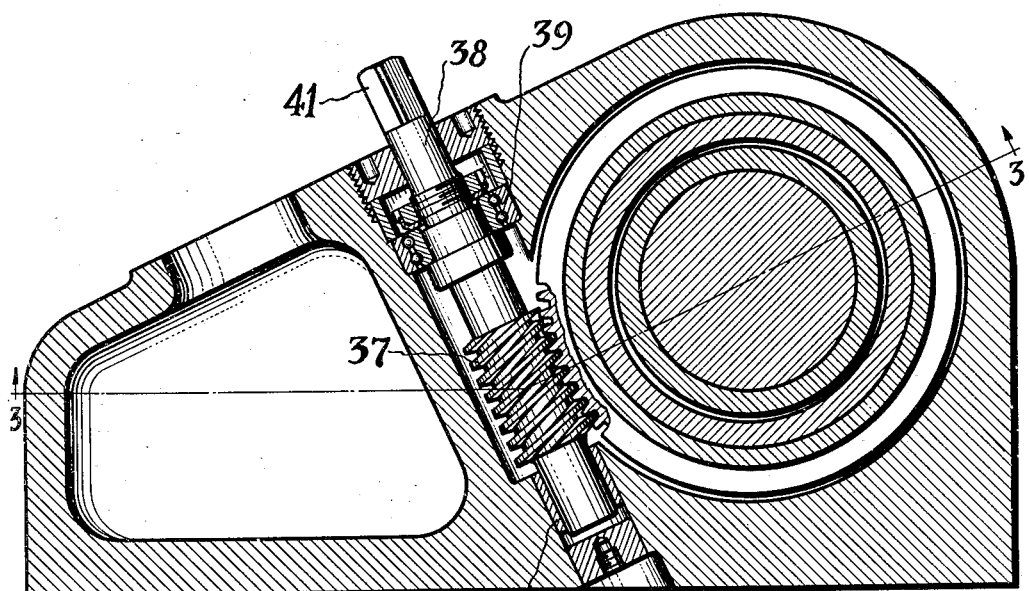
Figure 2 is a transverse section through the adjusting means as on the line 2—2 of Figure 1.

In the drawings the numeral 10 designates the bed of a grinding machine of standard conventional type having thereon the work head 11 provided with the journal or bearing portions 12 and 13, for the spindle 15 having mounted on one end the grinding wheel 16. It will be understood that the spindle is suitably driven as by application of power to the pulley 17 thereon and is rotated at a sufficiently high rate to produce a peripheral speed of five to seven thousand feet per minute, for example, of the grinding wheel carried thereby. As previously mentioned, a machine of the type here illustrated is intended for extremely accurate precision grinding, with the result that a very close fitting bearing must be employed to prevent spindle vibration and consequent variance in size of work pieces produced thereby. Difficulties have been experienced with bearings of this nature, due to their tendency to seize or grab and fail but, in spite of these difficulties, use has been generally made in all commercial machines of this type of bearing due to the smoothness of running of the spindle resulting therefrom.

Figure 3:
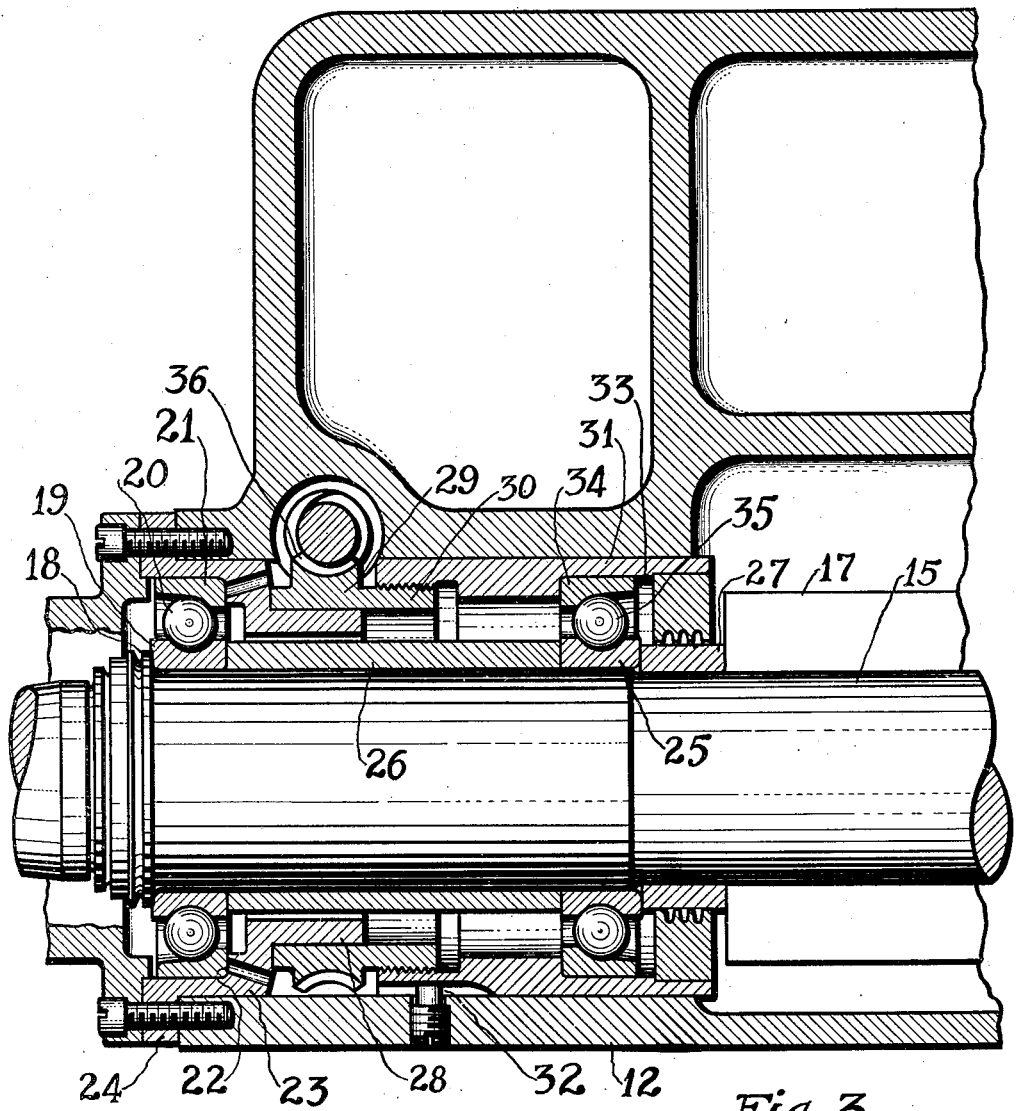
Figure 3 is a fragmentary longitudinal section through the bearing and adjusting means therefor as on the line 3—3 of Figure 2.

The present invention contemplates a means by which equal smoothness and satisfactory operation of the spindle may be attained while utilizing ball or like anti-friction bearings not subject to the difficulties aforesaid. The manner of accomplishment of this result is particularly illustrated in Figure 3, in which the spindle 15 is shown as provided with the shoulder 18 interlocking with the inner race member 19 for the ball or anti-friction bearings 20 exteriorly engaged by a second race 21. This latter race 21 fits in the socket 22 of sleeve 23 having a flange 24 terminally secured to the journal portion 12 of the grinding wheel head. Engaged on the spindle and having one end bearing against the race 19 and the other against a second race 25 on the spindle, is a spacing sleeve 26 serving to hold the two inner races in desired spaced relation on the spindle. Interiorly, the race 25 abuts spacer 27, which has its other end engaged at pulley 17, preventing axial movement of the race 25 and thus the inner series of races as respects the spindle. It is to be understood that a similar structure may be utilized within journal 12 and it is not therefore necessary that this duplication of parts be here illustrated for a proper understanding of the invention.

Sleeve 22 is formed with a reduced portion 28, on which is rotatably mounted an adjusting sleeve 29 having a portion 30 telescoped in threaded engagement with the longitudinally shiftable sleeve 31 keyed, as at 32, for sliding but against rotative movement. This member 31 has a recess or pocket 33 to receive the outer race 34 for the inner bearings 35 co-operating with the inner race 25.

For purposes of adjustment of the rotary threaded sleeve 29, the same is provided with a peripheral worm gear portion 36 having permanently meshing therewith worm 37 on spindle 38, which is, itself, permanently mounted in the anti-friction thrust bearing 39 at one end and bushing 40 at the other, to facilitate free rotation thereof. This spindle projects exteriorly of the journal cap 12 terminating in the square end 41 for manipulation by a suitable wrench or the like, to rotate the worm and thus transmit slow positive rotative movement to sleeve 29.

From the foregoing, it will be seen that the inner bearing races 19 and 25 are permanently secured or forced in definite position on spindle 15, while the outer races 21 and 34 for the anti-friction bearings 20 and 35 may be variably separated or forced apart by relative screwing of the telescopic sleeve members 30 and 31. This, while exteriorly accomplishable through rotation of spindle 38, may be performed after the entire machine has been assembled and while same is being operated, thus creating the necessary pre-loading or initial distortion of bearings 20 and 35. As a result of this adjustment there will be no appreciable yielding of the bearings under grinding load conditions so that smoothness of operation of the spindle may be satisfactorily attained.

What is claimed is:

1. In a grinding machine the combination with a frame unit, including a journal, of a grinding wheel spindle disposed within the journal, a means for eliminating chatter of the spindle while facilitating free rotation thereof, said means including spaced inner bearing races, means securing said races against relative axial movement, spaced outer races, bearings interposed between said races, telescoping spacing members intermediate said outer races having inter-engaged threaded connection one with the other, means securing one of said members against rotative movement, and an operating member carried by the journal and exteriorly accessible as respects thereto for rotating the other of said members to adjust the distance between the outer races and effect pre-loading of the interposed bearings.

2. A grinding machine including a supporting unit having a journal and a grinding wheel spindle disposed within said journal, anti-friction bearings carried by the journal to facilitate free rotation of the spindle, said bearings including spaced axially immovable inner races, circumscribing anti-friction members and enclosing outer races, a telescoping spacing member for the outer races including a pair of inter-threaded parts, means securing one of said parts for axial sliding but against rotative movement within the journal, the other of said parts having a peripheral gear formed thereon, and an adjusting member rotatively mounted in the journal having an actuating portion meshing with the gear within the journal and an actuable portion accessible from the exterior of the journal whereby rotation may be imparted to the gear and its associated part from the exterior of the journal to vary the pre-loading distortion applied to the bearing members within the journal.

3. A machine of the character described, including a journal member, a spindle disposed within the journal, means supporting the spindle for free rotation including a pair of races carried by the spindle, means securing the races against axial movement relative the spindle, anti-friction bearings engaging the races, co-operating spaced outer races for said bearings, a means for adjustably supporting the outer races within the journal including a sleeve having a portion secured to the journal and having an interior pocket receiving one of the outer races, a second spaced sleeve slidably supported within the journal and having a pocket receiving the other outer race, means securing said second sleeve against rotative movement within the journal, an interposed adjusting member having a portion rotatably supported by the first sleeve and in terminal abutting engagement with said sleeve, said member having an axially extending portion in threaded engagement with the second sleeve and having a circumscribing worm gear formed thereon, and an adjusting spindle mounted in the journal having a worm meshing with the worm gear and adapted by rotation adjustably to determine and maintain desired relative separation of the sleeve members to vary the lateral deflecting pressure or preloading of the bearings through separation of the outer races.

4. In a grinding machine the combination of a frame or supporting unit, a journal carried thereby, a spindle within the journal having a shoulder formed thereon, a grinding wheel carried by the spindle, and means mounting the spindle and supported grinding wheel for free rotation within the journal comprising a pair of anti-friction bearings each having an inner race, an outer race and anti-friction members between the races, the inner races surrounding the spindle, a sleeve surrounding the spindle intermediate the inner races and definitely spacing them from one another, one of the races on the other side from the sleeve engaging the spindle shoulder, means secured to the spindle and engaging the other race on its side remote from the sleeve contacting side, said securing means definitely fixing the inner races and spacing sleeve relative to the spindle, a cup shaped sleeve having a shouldered seat, a flange and a bearing portion secured to the end of the journal and restrained against rotative and axial movement, a second sleeve within the journal having a shouldered seat formed interiorly thereof and a spline exteriorly, the said sleeve being adjustably spaced from the first sleeve, a pin extending from the journal into the spline in the second sleeve to prevent rotative movement of the sleeve while permitting longitudinal axial shifting thereof, each of the sleeves receiving on their shouldered seats one of the outer races, an adjusting member rotatively mounted on the bearing portion of the first sleeve and having threaded engagement with the second sleeve, said adjusting member having a circumscribing worm gear formed thereon, and means accessible exteriorly of the journal interengaged with the circumscribing worm gear for actuating the adjusting member and axially shifting the cup shaped sleeves relative to one another for distorting the anti-friction members between the inner and outer races a prescribed amount to thereby eliminate chatter during operation of the grinding wheel.

In testimony whereof I affix my signature.

BRUNO LUNDGREEN.